United States Patent [19]

Douglas

[11] 4,139,647

[45] Feb. 13, 1979

[54] METHOD OF PREPARING A FRUIT OR VEGETABLE PUREE

[75] Inventor: George Douglas, Los Angeles, Calif.

[73] Assignee: Selective Licensing Incorporated, Los Angeles, Calif.

[21] Appl. No.: 839,199

[22] Filed: Oct. 4, 1977

Related U.S. Application Data

[63] Continuation-in-part of Ser. No. 736,879, Oct. 29, 1976, abandoned.

[51] Int. Cl.² .................... A23L 1/20; A23L 1/212
[52] U.S. Cl. ............................ 426/482; 83/15; 83/22; 99/467; 99/483; 426/481; 426/484; 426/518; 426/521
[58] Field of Search ............ 426/320, 331, 333, 335, 426/532, 615, 654, 419, 481, 482, 483, 589, 599, 518, 520, 521, 484; 21/2, 58; 83/14, 15, 22, 23, 27, 49, 171; 99/467, 483

[56] References Cited

U.S. PATENT DOCUMENTS

| | | | |
|---|---|---|---|
| 1,259,410 | 3/1918 | Kapadia | 426/419 X |
| 3,365,307 | 1/1968 | Dixon | 426/419 X |
| 3,399,064 | 8/1968 | Partyka et al. | 426/589 |
| 3,549,384 | 12/1970 | Walker et al. | 426/518 X |
| 3,764,348 | 10/1973 | Huxsoll et al. | 426/419 X |
| 3,873,753 | 3/1975 | Nelson et al. | 426/521 X |
| 3,892,877 | 7/1975 | Wagner et al. | 426/510 X |
| 3,927,588 | 12/1975 | Laderach | 426/518 X |
| 4,022,922 | 5/1977 | Nelson | 426/481 X |

FOREIGN PATENT DOCUMENTS

1339939  12/1973  United Kingdom ............ 426/518

Primary Examiner—Arthur L. Corbin
Attorney, Agent, or Firm—Wegner, Stellman, McCord, Wiles & Wood

[57] ABSTRACT

Whole (unsliced) fruit or vegetable product is introduced into a chamber wherein an enzyme inactivating environment has been established and which is maintained by a constant flow of a hot dry inert gas. The product is sliced by hot knives into small pieces in the chamber. The sliced fruit or vegetable product is maintained in such environment long enough to completely inactivate the enzymes and then is introduced into a pulper-finisher to macerate the product and separate the puree from the peel and fiber.

2 Claims, 3 Drawing Figures

METHOD OF PREPARING A FRUIT OR VEGETABLE PUREE

CROSS-REFERENCE

This application is a continuation-in-part of my co-pending application Ser. No. 736,879, filed Oct. 29, 1976, now abandoned.

BACKGROUND OF THE INVENTION

In the conventional method of pureeing fruit or vegetable products, the product is first peeled and then macerated or crushed. The macerated product is then separated, to separate the puree from the seeds and fiber. This latter step normally takes place in a pulper-finisher or a centrifuge. The puree is then preserved by freezing, pasteurization, sterilization, or the like.

Although heat is sometimes used during the normal pureeing process, enzymes released during maceration act so quickly that undesirable off-flavor, color destruction, browning, and nutrient loss occurs before the heat can inhibit the enzyme activity. On the other hand, if whole fruit is blanched before maceration, heat penetration is so slow that it may initially activate the enzymes before the heat rises to inhibition temperatures. Heat penetration into whole fruit or vegetables is relatively slow, and the time for full heat penetration is so long as to actually initiate enzyme activity even within the cellular structure of the product before inhibition occurs.

Another disadvantage of heating whole fruit or vegetables is that by the time the product is maintained under heat long enough to insure full penetration to the center, the outer portions of the product may be cooked or semi-cooked, thus producing an inferior product.

SUMMARY OF THE INVENTION

According to the present invention there is produced a puree of superior quality, in that the process used is such as to inactivate the enzymes in the product prior to enzyme activity taking place, thus forestalling a browning or discoloration, or off-flavor characteristics from developing. According to my process, the unpeeled fruit or vegetable is introduced into a chamber in which an enzyme inactivating environment has been established and is maintained by passing a hot dry inert gas therethrough, for example, gas from an inert gas generator at a temperature of between 280° F. to 300° F. In this enzyme inactivating environment, the fruit or vegetable product is sliced, peel and all, by heated knives. The slices may be relatively large compared to previous processes. The sliced product is maintained in the enzyme inactivating environment sufficiently long as to insure the inhibition of enzyme action. This is normally sufficient time to bring the sliced product to a temperature of above 180° F. The hot sliced product is then moved to a pulper-finisher which macerates the sliced product and separates the puree from the peel, seeds, and other fibrous material. The puree may then be preserved by freezing, sterilization, or the like, while the by-product of fibrous material may also be used in other food products, for example, "natural" food products.

DESCRIPTION OF THE PREFERRED EMBODIMENT

Figure 1:
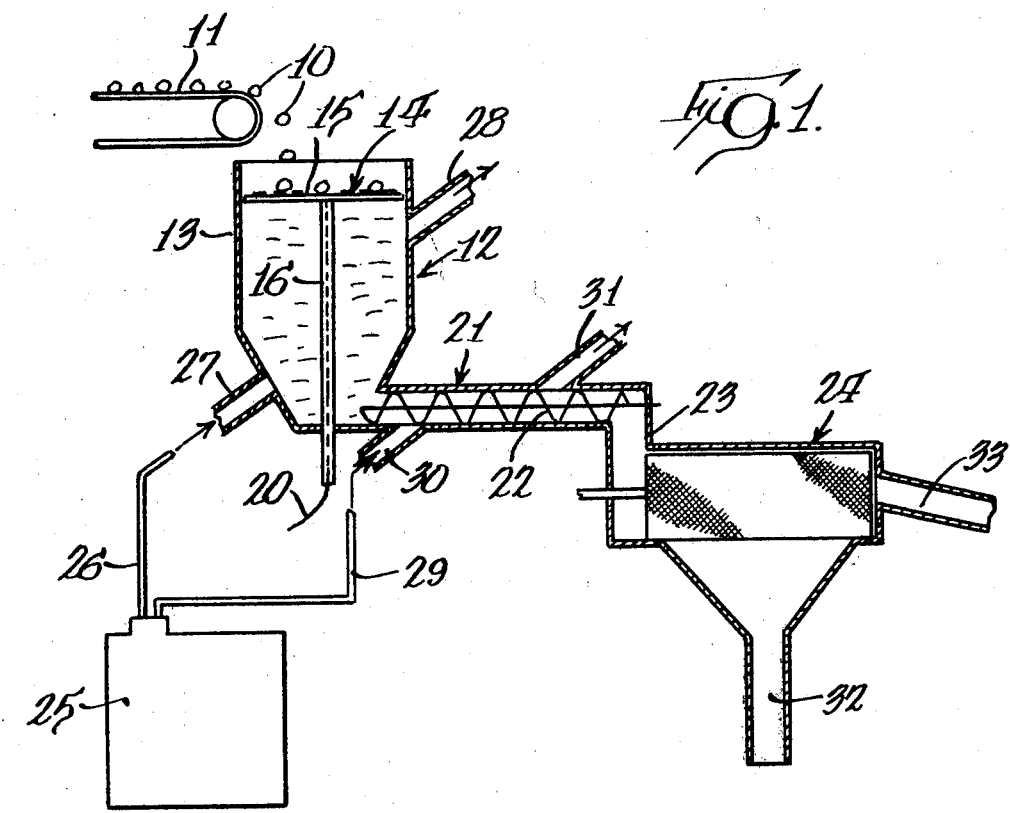
FIG. 1 is a schematic view of an apparatus suitable for carrying out the process.
Figure 2:
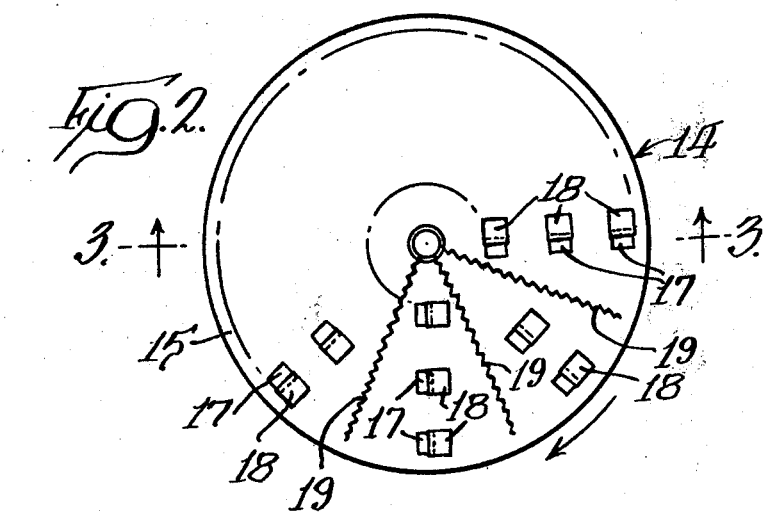
FIG. 2 is a top plan view of the cutter used in the process.
Figure 3:
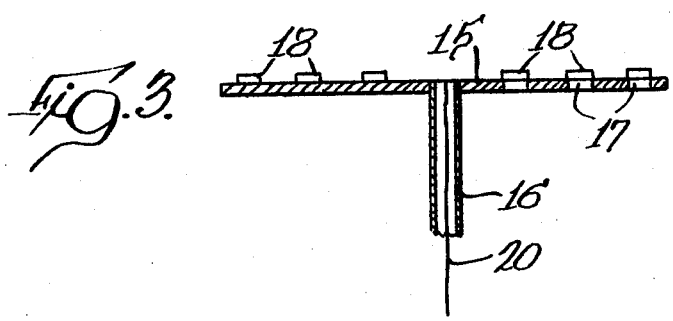
FIG. 3 is a vertical section taken along line 3—3 of FIG. 2.

Referring now to the drawings, the fruit or vegetable product 10 is moved by a conveyor 11 into a chamber system 12. The chamber system 12 includes a first cylindrical portion 13 into which the product is first introduced, with the first portion containing a slicer 14 therein which slices the product. The slicer 14 includes a disc 15 mounted at the upper end of a hollow shaft 16. The shaft 16 is rotatably mounted in the chamber 13. A plurality of openings 17 are provided in the disc 15 adjacent each of which there is located a cutting knife or blade 18. Imbedded in the disc 15 are resistance wires 19 connected to central wiring 20 extending through the shaft 16. The wiring 20 is connected to a source of electricity and means, not shown, are provided for rotating the shaft 16 and hence the cutter disc 15. During operation of the system the knives are electrically heated to and maintained at temperatures of between 250° F. and 400° F., and thus the cutting operation can be defined as a "hot slicing" method.

As previously noted, the fruit or vegetable product 10 need not be peeled and, in fact, should not be peeled before being introduced into the chamber system. The slicer 14 will slice the fruit or vegetable product into slices varying between 1/16 inch and 1½ inches in thickness, depending upon the particular fruit or vegetable product involved. For example, unpeeled bananas are sliced into lengths of approximately 1½ inches each for the purpose of the process. The size of the openings 17 determines the size of the slices. The purpose of slicing is to permit penetration of heat into the fruit cells to destroy the enzymes before maceration and disruption of the cells. When the cells are disrupted, thus releasing enzymes, the enzymes have already been inhibited or destroyed. For most fruits and vegetables, the slices may be from 1/16 inch to ⅛ inch thick for good results. However, in the case of bananas and apples, where discoloration is extremely rapid once the cells are disrupted, it is best to have thicker slices, on the order of 3/16 inch to ⅛ inch.

From the first chamber portion 13, the sliced product drops into a second chamber portion 21, from which it is conducted by means of a screw conveyor 22 to a passage 23 leading to a pulper-finisher 24 of the usual screen and scroll type.

The interior of the chamber system 12 is maintained at an elevated temperature to produce an atmosphere or environment which inactivates the enzyme in the fruit or vegetable product.

The enzyme inactivating environment is established by constantly passing a hot dry inert gas through the chamber at atmospheric pressure. Thus there is provided an inert gas generator 25 which may be of the usual type wherein a propane flame eliminates oxygen and water from air to produce such a gas. Other inert gases, such as nitrogen, may also be used. Hot gases at a temperature of about 280° F. to 300° F. pass from the generator 25 through conduit 26 into inlet 27 into the interior of chamber 13 and pass out of the chamber through exhaust outlet 28. Steam is not suitable as a heating gas for several reasons. First, water in the steam may condense in the process. This dilutes the product.

Secondly, when dilution occurs, enzyme activity is accelerated, a condition to be avoided. The hot gas is constantly flushing the chamber portion 13 to maintain the chamber as an enzyme inactivating environment while simultaneously removing any traces of oxygen from the chamber. The second chamber portion 21 is also maintained at enzyme inhibiting temperatures by the introduction of hot gas thereinto through conduit 29, into inlet 30, and gas exhausts through the outlet 31.

From the pulper-finisher 24, the puree is discharged through an outlet 32 from which it passes to a preserving operation, such as freezing or sterilization, while the peel fragments and other fibrous material is discharged through the second outlet 33.

The product is maintained in the system sufficiently long to bring the temperature of the product to above 180° F. The length of time the sliced material must be maintained in the chamber system to bring the product to that temperature and thus inactivate the enzymes depends upon the temperature of the system. For example, if the temperature is of the order of 300° F., a time of 30 seconds is sufficient; at 250° F., one to two minutes is required; at 212° F. 2½ to 3½ minutes is necessary; while at mere blanching temperature of 180° F. the slices must be maintained in the chamber system for 4 to 5 minutes.

An additional advantage of the present process is the superior quality of the puree produced. For example, soybeans heretofore have been heat treated at 260° F. for 4 to 8 minutes. This treatment of the whole bean destroys the lipase which results in the oil of the soybean becoming rancid. When the beans are then ground, the proteins are found to be denatured and substantially less digestible. If, however, soybeans are sliced and treated in the manner just described herein so as to inactivate the enzymes at or immediately after slicing, there is no damage or destruction to protein, nor is the digestibility reduced.

Several beneficial results flow from the fact that in the present process the fruit or vegetable product is not peeled before being introduced into an enzyme inactivating environment and sliced. Because the slicing in the present process produces relatively large pieces, the peel is easily separated from the puree in the pulper-finisher, something which could not be accomplished in previous processes where the slicing was into very small pieces. Secondly, by not removing the peel, enzyme activity is not initiated prior to the introduction of the fruit or vegetable product into the chamber system.

As previously pointed out, not only is a superior puree produced by the present process, a puree free of discoloration and free of flavor deterioration, but the by-products of the peel and fiber produced by the present process are also a valuable food product and useful for many purposes.

I claim:

1. The method of forming a puree of a fruit or vegetable product which comprises, heating a chamber and flushing oxygen therefrom by continuously passing a dry inert gas heated to a temperature of between 280° F. and 300° F. through said chamber, introducing an unpeeled fruit or vegetable product into said chamber, hot slicing the product in the chamber with preheated knives to produce pieces having a minimum dimension of from ⅛ inch to 3/16 inch and a maximum dimension of from ½ inch to 1½ inches, maintaining the sliced product in the chamber for a length of time sufficient to inactivate the enzymes therein, and then macerating the product to produce a puree and separating the puree from the peel and fiber.

2. The method of forming a puree of a fruit or vegetable product which comprises, heating a chamber and flushing oxygen therefrom by continuously passing a dry inert gas heated to a temperature of between 280° F. and 300° F. through said chamber, introducing an unpeeled fruit or vegetable product into said chamber, hot slicing the product in the chamber with knives preheated to and maintained at a temperature of between 250° F. and 400° F. to produce pieces having a minimum dimension of from ⅛ inch to 3/16 inch and a maximum dimension of from ½ inch to 1½ inches, maintaining the sliced product in the chamber for a length of time sufficient to bring the temperature of the product to above 180° F. to inactivate the enzymes therein, and then macerating the product to produce a puree and separating the puree from the peel and fiber.

* * * * *